INVENTORS
BRUCE L. ETTINGER
SAMUEL M. WOLOSIN
BY Harold J. Holt
ATTORNEY

United States Patent Office 3,666,526
Patented May 30, 1972

3,666,526
REFRACTORY POROUS BODIES
Bruce L. Ettinger, Detroit, and Samuel M. Wolosin, Oak Park, Mich., assignors to General Electric Company
Filed Jan. 6, 1966, Ser. No. 519,080
Int. Cl. C23c 13/00
U.S. Cl. 117—46 CB   12 Claims

ABSTRACT OF THE DISCLOSURE

Porous bodies of interconnected cellular structure having extremely high strength-to-weight ratios at elevated temperaures. The porous bodies have a foam substrate of uniform cell structure, produced by the thermal decomposition of an organic foam, and a refractory coating on the substrate of a vapor-deposited pyrolytic material.

---

This invention relates to refractory porous bodies having extremely high strength-to-weight ratios at elevated temperatures, and more specifically to refractory porous bodies having a carbonaceous substrate and a refractory pyrolytic coating deposited thereon, and to a process for producing such porous bodies.

Considerable attention has recently been devoted to the utilization of pyrolytic materials, and particularly pyrolytic graphite, as a space-age material, primarily because of the unique high-temperature properties of these materials. However, these materials are generally only available in high-density, non-porous form. For many applications, it would be desirable to have such materials available in low-density form.

It is a primary object of the present invention to produce refractory materials in porous form having extremely high strength-to-weight ratios and extremely high thermal insulation properties. It is an additional object of the present invention to provide a unique low-density material having an interconnected, uniform cell structure which is capable of being subjected to temperatures of the order of 5000° F. without loss of structural integrity. It is an additional object of this invention to provide a process for producing such porous bodies.

It has now been discovered that foams of pyrolytic materials of extremely high strength-to-weight ratios and thermal insulation properties may be prepared having a non-pyrolytic foam substrate and a coating on said substrate of a vapor-deposited pyrolytic material. The substrate may, for example, be produced by the thermal decomposition of an organic foam in a non-oxidizing atmosphere. The coating in its preferred form is pyrolytic graphite.

In one form, the process of the invention comprises thermally decomposing an organic foam of uniform cell structure in a non-oxidizing atmosphere to produce an essentially carbonaceous substrate in which the cellular structure of the foam remains intact. A coating of pyrolytic material, such as graphite, graphite-boron alloys, or other pyrolytic refractory metals or alloys, is then vapor-deposited on the substrate to form the refractory foam.

Figure 1:
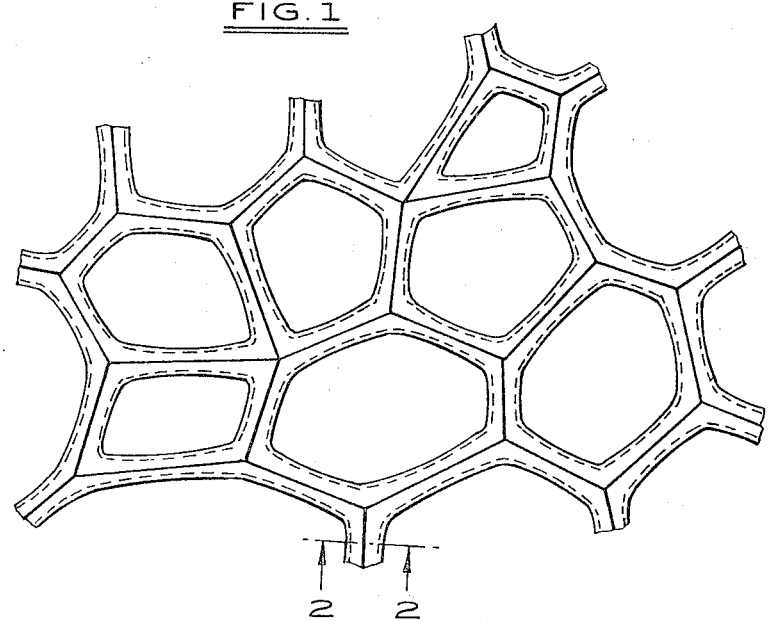
Figure 2:
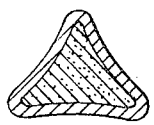

The invention will be better understood from the following description taken in connection with the accompanying drawing in which FIG. 1 shows in enlarged cross section a porous body made in accordance with the practice of this invention and FIG. 2 is a cross section taken along the lines 2—2 of FIG. 1.

In carrying out the invention, there is first selected a suitable foam substrate, such as the polyurethane, polystyrene or cellulose foams that are commercially available. This oragnic foam structure is then preferably saturated with an organic thermosetting resin, such as a phenolic or epoxy resin. These resins act as binders to maintain the foam structure intace. The binders must be capable of maintaining the foam structure intact at the elevated temperatures of decomposition of the orgnaic foam and must also be capable of decomposing to carbon. The saturated sponge or foam may then be heated in an oven to cure the resin. This step is used if a rigid structure is desired, for example, to shape or cut the foam prior to decomposition. The organic structure is then placed in a furnace in the presence of a non-oxidizing atmosphere to thermally decompose the organic foam without, however, destroying its cellular structure. A non-oxidizing atmosphere is necessary to prevent oxidation of the carbon. The decomposition of the organic foam is ordinarily accomplished in a reducing atmosphere, such as dry hydrogen, or in an inert atmosphere, such as argon or helium. In its preferred form, the decomposition or charring will take place with successively higher temperatures running from perhaps room temperature to as high as 2100° F., or even higher, until the foam structure is essentially reduced to carbon the cellular structure however remaining intact.

The thermally decomposed and essentially carbonaceous structure is then placed in a vacuum furnace for the vapor deposition of the pyrolytic coating. The foam structure is at this point free-standing and should be essentially reduced to carbon to prevent subsequent out-gassing of the substrate during vapor deposition and to insure an ultimately all-carbon substrate. Vapor deposition may be accomplished in accordance with known pyrolytic deposition procedures. In the case of pyrolytic graphite, a carbonaceous gas, such as natural gas or methane, is passed at low pressure over the foam structure while the foam structure is held at an elevated temperature of, for example, 800–2800° C. (depending on the material deposited) whereupon pyrolysis occurs and the pyrolytic graphite is vapor-deposited on the exposed substrate surface.

The following example is illustrative of the practice of the invention.

A commercially available, rectangularly shaped piece of polyurethane foam of open, interconnected, even cellular structure was impregnated with a thermosetting liquid phenolic resin (GE phenolic resin 12304) and cured in an air oven at 275–300° F. for 15 minutes. The cured sample was then treated in a hydrogen-atmosphere furnace in accordance with the following cycle:

| Temperature (° F.): | Time (hrs.) |
|---|---|
| Room temperature to 600 | ½ |
| Hold at 600 | ½ |
| 600–1300 | 2 |
| Hold at 1300 | 1 |
| 1300–2100 | 3½ |
| Hold at 2100 | ½ |
| Slowly cool. | |

The charred sample prepared as above, with the foam structure still intact, was subsequently placed in a vacuum furnace. The vacuum furnace was evacuated to $1 \times 10^{-2}$ mm. mercury pressure. The temperature of the furnace was then raised to 2200° C. while maintaining the foregoing pressure. Methane gas was introduced at the rate of 12 s.c.f.h. (standard cubic feet per hour). The pressure was then adjusted to $8 \times 10^{-2}$ mm. of mercury and held at this condition of glas flow and pressure for 108 hours. The gas flow was then terminated and the furnace permitted to cool.

The foregoing example was repeated with three different foam sizes—10, 20 and 30 pores per linear inch polyurethane foam. The densities of the resulting pyrolytic graphite foamed bodies were as follows:

10 pores/linear in.—.05 gram/cc. (2% of theoretical solid carbon)
20 pores/linear in.—.08 gram/cc. (3.7% of theoretical solid carbon)
30 pores/linear in.—.11 gram/cc. (4.8% of theoretical solid carbon)

The final product consisted of an open-pore, essentially all-carbon foam having an amorphous carbon substrate and a coating of pyrolytic graphite. The foam structure was completely interconnected, relatively uniform in cell size, providing a free-standing body of extremely high strength/weight ratio capable of withstanding high temperatures.

In place of an organic foam, a metallic foam such as iron, nickel, copper, tungsten, tantalum, or tungsten carbide could have been used as the substrate. Such metallic foams are disclosed, for example, in U.S. Pats. 3,052,967 and 3,111,396. The substrate must however, whether carbonaceous or metallic, be an open, interconnected foam structure of relatively uniform cell structure. If the foam structure is not open and interconnected, it would not be possible to vapor-deposit a coating throughout. In the case of organic foam starting materials, it must, in addition, be open and interconnected to saturate with a thermosetting resin. In addition, it must be capable of retaining such cellular structure during the vapor-deposition process.

Reference herein to "uniform cell structure" of the foam substrate is intended to identify foam structures of the type commercially available in which there is present an interconnected network of a large number of open, relatively uniform three-dimensional cells, randomly oriented to form a three-dimensional porous structure. It is not intended to mean that the cells are of the same dimensions but rather of the same general three-dimensional bulk appearance or, stated otherwise, of the same general geometric configuration. The term specifically excludes, for example, non-cellular porous substrates made from fibrous materials, such as felt or cloth.

The organic foams useful in the invention are well known articles of commerce. Illustrative examples of such foams are disclosed in the aforesaid U.S. Pat. 3,111,396. This patent also discloses binders useful for impregnating the organic foams to maintain their structural integrity during the thermal decomposition step.

The porous bodies of the invention may be made with coatings other than pyrolytic graphite. A number of other refractory materials are capable of pyrolysis and deposition in the vapor phase and thus possess the high-temperature properties which make it suitable for forming the porous bodies of the invention. Such additional materials include the refractory metals of Groups IV, V and VI of the Periodic Table and their carbides, borides and nitrides such as hafnium, molybdenum, niobium silicon, tantalum, tungsten, titanium and zirconium. These materials may be pyrolytically deposited by using as starting materials the halogenated derivatives of the foregoing metals, as for example tungsten hexafluoride or tantalum chloride.

What we claim as new and desire to secure by Letters Patent of the United States is:

1. A refractory porous body of open interconnected cellular structure, said porous body having a carbonaceous foam substrate of uniform cell structure produced by the thermal decomposition of an organic foam, and a refractory coating on said substrate of a material selected from the group consisting of pyrolytic graphite, pyrolytic refractory metals of Groups IV, V and VI of the Periodic Table, and pyrolytic compounds of such metals.

2. The refractory porous body of claim 1 in which the coating is pyrolytic graphite.

3. A refractory porous body of open interconnected cellular structure, said porous body having a carbonaceous foam substrate of uniform cell structure produced by the thermal decomposition of an organic foam in a non-oxidizing atmosphere, the cellular structure of said organic foam remaining intact, and a refractory coating on said substrate of a material selected from the group consisting of pyrolytic graphite, pyrolytic refractory metals of Groups IV, V and VI of the Periodic Table, and pyrolytic compounds of such metals.

4. The refractory porous body of claim 3 in which the coating is pyrolytic graphite.

5. A process for producing a refractory porous body comprising
providing a foam substrate, the cellular structure of which comprises open interconnected cells of uniform structure produced by the thermal decomposition of an organic foam and
vapor-depositing on said substrate a refractory coating of a material selected from the group consisting of pyrolytic graphite, pyrolytic refractory metals of Groups IV, V and VI of the Periodic Table, and pyrolytic compounds of such metals.

6. A process for producing a refractory porous body comprising
thermally decomposing an organic foam of open interconnected cells of uniform structure in a non-oxidizing atmosphere to produce a carbonaceous substrate in which the cellular structure of the foam remains intact, and
vapor-depositing on said substrate a refractory coating of a material selected from the group consisting of pyrolytic graphite, pyrolytic refractory metals of Groups IV, V and VI of the Periodic Table, and pyrolytic compounds of such metals.

7. A process for producing a refractory porous body comprising
impregnating a porous organic foam with a thermosetting resin,
heating the impregnated porous organic foam in a non-oxidizing atmosphere to remove essentially all non-carbonaceous constituents of the porous organic foam while maintaining substantially intact its size and shape to produce a carbonaceous foam substrate of open interconnected uniform cell structure, and
vapor-depositing at subatmospheric pressures on said porous substrate, while said substrate is maintained at an elevated temperature, a coating of a material selected from the group consisting of pyrolytic graphite, pyrolytic refractory metals of Groups IV, V and VI of the Periodic Table, and pyrolytic compounds of such metals.

8. The process of claim 7 in which the coating is pyrolytic graphite.

9. A porous body of open interconnected cellular structure, said porous body having a carbonaceous foam substrate of uniform cell structure produced by the thermal decomposition of an organic foam, and a coating of pyrolytic graphite on said substrate.

10. A porous body of open interconnected cellular structure, said porous body having a carbonaceous foam substrate of uniform cell structure produced by the thermal decomposition of organic foam, an intermediate layer composed of a pyrolyzed thermosetting resin, and a coating of pyrolytic graphite on said intermediate layer.

11. A process for producing a porous body comprising thermally decomposing an organic foam to produce a carbonaceous substrate of open interconnected cell structure in which the cellular structure of the foam remains intact, and vapor-depositing on said substrate a coating of pyrolytic graphite.

12. A process for producing a porous structure comprising coating the surfaces of an organic foam with a thermosetting resin, heating the coated foam to cure the thermosetting resin, further heating the coated foam to pyrolyze the material and produce a carbonaceous foam substrate of open interconnected cell structure and vapor-depositing on said substrate a coating of pyrolytic graphite.

References Cited

UNITED STATES PATENTS

| | | | |
|---|---|---|---|
| 3,107,180 | 10/1963 | Diefendorf | 117—46 CG |
| 3,111,396 | 11/1963 | Ball | 264—44 |
| 3,164,487 | 1/1965 | Carley-Macauly et al. | 117 46 CG |
| 3,317,338 | 5/1967 | Batchelor | 117—95 X |
| 3,345,440 | 10/1967 | Googin et al. | 264—44 X |
| 2,789,038 | 4/1957 | Bennett et. al. | |
| 3,052,967 | 9/1962 | Fischer. | |
| 3,175,918 | 3/1965 | McGrahan et al. | |
| 3,353,994 | 11/1967 | Welsh et al. | 117—98 X |
| 3,558,344 | 1/1971 | Peterson et al. | 117—98 X |
| 2,918,392 | 12/1959 | Beller | 117—98 |
| 3,536,480 | 10/1970 | Winkler | 117—98 X |

FOREIGN PATENTS

| | | |
|---|---|---|
| 550,379 | 1/1943 | Great Britain. |

ALFRED L. LEAVITT, Primary Examiner

U.S. Cl. X.R.

117—46 CG, 98, 106 R, 107, Dig. 9, Dig. 11, Dig. 12